United States Patent [19]
Okada

[11] Patent Number: 5,386,290
[45] Date of Patent: Jan. 31, 1995

[54] OPTICAL INTERFEROMETRIC ANGULAR RATE METER WITH A SELF-DIAGNOSTIC CAPABILITY

[75] Inventor: Kenichi Okada, Tokyo, Japan

[73] Assignee: Japan Aviation Electronics Industry Limited, Tokyo, Japan

[21] Appl. No.: 51,995

[22] Filed: Apr. 26, 1993

[30] Foreign Application Priority Data

Apr. 30, 1992 [JP] Japan ................. 4-111575
May 15, 1992 [JP] Japan ................. 4-123450
May 15, 1992 [JP] Japan ................. 4-123451

[51] Int. Cl.$^6$ ............................................. G01C 19/72
[52] U.S. Cl. ............................................. 356/350
[58] Field of Search ............................................. 356/350

[56] References Cited

U.S. PATENT DOCUMENTS

4,796,993  1/1989  Sonobe et al. ................ 356/350

FOREIGN PATENT DOCUMENTS

0462580  12/1991  European Pat. Off. ............ 356/350

OTHER PUBLICATIONS

Pat. Abstracts of Japan, vol. 16, No. 348 (P1393) Jul. 28, 1992 Koichi "Signal Proc. System for Optical Fiber Gyroscope".
Patent Abstracts of Japan, vol. 15, No. 382 (P1257), Sep. 26, 1991 Kenji "Correcting System for Phase Modulation Opt. Fiber Gyro".
Pat. Abstracts of Japan, vol. 15, No. 495, Dec. 13, 1991 (P1288) Koichi "Automatic Phase Adj. Circuit in Opt. Fiber Gyroscope".
Pat. Abstracts of Japan, vol. 16, No. 241 (P1363), Jun. 3, 1992, Koichi "Light Interference Angular Veloc. Meter with Fault Self-Diagnosis Function".

*Primary Examiner*—Samuel A. Turner
*Attorney, Agent, or Firm*—Pollock, Vande Sande & Priddy

[57] ABSTRACT

Light is supplied as clockwise and counterclockwise light beams to both ends of an optical fiber coil, the clockwise and counterclockwise light beams having propagated through the optical fiber coil interfere with each other, and the interference light is converted by a photodetector into an electrical signal. Both light beams are phase modulated by a phase modulator and the phase modulation frequency component is synchronously detected by a synchronous detector, from which a signal corresponding to an input angular rate is output. A reference signal generator generates a first reference signal of an odd harmonic frequency of the phase modulation frequency and a second reference signal of an even harmonic frequency of the phase modulation frequency. A change-over switch responds to a diagnosis instruction signal to selectively supply either one of the first and second reference signals to the synchronous detector. The synchronously detected output obtained with the second reference signal is output as a self-diagnosis signal, and a diagnosis circuit makes a diagnosis by determining whether the level or frequency of the self-diagnosis signal is within a predetermined range.

15 Claims, 11 Drawing Sheets

OPTICAL INTERFEROMETRIC ANGULAR RATE METER WITH A SELF-DIAGNOSTIC CAPABILITY

BACKGROUND OF THE INVENTION

The present invention relates to an optical interferometric angular rate meter or fiber optic gyro which measures an input angular rate by detecting that the phase difference between light beams propagating through such a looped optical path as an optical fiber coil in opposite directions varies with the input angular rate. More particularly, the invention pertains to a fiber optic gyro with a self-diagnostic capability whereby the gyro is allowed to make a self-check of a failure and indicate its occurrence to a host system or send thereto a self-checking signal when the gyro performance or function is impaired or degraded.

A description will be given first, with reference to FIG. 1, of a conventional fiber optic gyro. Light I from a light source 11 passes through an optical coupler 12, a polarizer 13 and an optical coupler 14 and then enters into an optical fiber coil 15 from its opposite ends, which coil is used as an optical path. A light source driver 23 drives the light source 11, and it is composed of, for instance, a circuit which merely supplies current to the light source 11 and a circuit which monitors a portion of the quantity of light from the light source 11 by means of a photodetector and automatically controls the light source 11 to emit a fixed quantity of light at all times.

A reference signal generator 24 applies a modulation signal Sp via a modulator driver 22 to a phase modulator 16. The clockwise and counterclockwise light beams which propagate through the optical fiber coil 15 are phase modulated by the phase modulator 16 inserted between one end of the optical fiber coil 15 and the optical coupler 14. The phase-modulated light beams are both combined by the optical coupler 14 with the light beam emitted from the other end of the optical fiber coil 15 and interfere with each other, and the interference light is provided via the polarizer 13 to the optical coupler 12, by which it is branched to a photodetector 17.

Letting the phase modulation by the phase modulation signal Sp be represented by $P(t) = A\sin\omega_p t$, the output Vp of the photodetector 17 is expressed by the following equation:

$$Vp = (I/2)K_{op}K_{pd}\{1 + \cos\Delta\Phi(\Sigma\epsilon_n(-1)^n J_{2n}(x)\cos 2n\omega_p t') - \sin\Delta\Phi(2\Sigma(-1)^n J_{2n+1}(x)\cos(2n+1)\omega_p t')\} \quad (1)$$

In the above, $\Sigma$: a summation operant from n=0 to infinity;

$t'$: $t - \tau/2$ $\epsilon_n$: 1 for n=0, $\epsilon_n$=2 for n≧1

$K_{op}$: optical loss on the emitted light I from the light source 11 which is caused by the optical path to the photodetector 17;

$K_{pd}$: a constant which is determined by a photoelectric conversion coefficient, an amplifier gain, etc.;

I: the quantity of light emitted from the light source 11;

Io: the maximum quantity of light which reaches the photodetector (Io=Kop·I)

$J_n(x)$: a Bessel function of the first kind, $x = 2A\sin\pi f_p\tau$;

A: a modulation index;

$\Delta\Phi$: the phase difference between the clockwise and counterclockwise light beams in the optical fiber coil 15;

$\omega_p$: an angular frequency of the phase modulation ($\omega_p = 2\pi f_p$, but in the following description, $\omega_p$ may sometimes be called a frequency as an equivalent to the frequency $f_p$, for the sake of brevity);

$\tau$: the time for propagation of light through the optical fiber coil.

In order that the phase difference $\Delta\Phi$ corresponding to the applied angular rate may be detected, with high sensitivity, from the output of the photodetector 17 expressed by Eq. (1), it is necessary to detect a $\sin\Delta\Phi$ component which maximizes the gradient of the phase difference $\Delta\Phi$ in the neighborhood of zero. As shown in Eq. (1), $\sin\Delta\Phi$ is a coefficient of odd harmonic components of the frequency $\omega_p$, and hence a desired one of these odd harmonic components needs only to be detected. This can be done by a synchronous detection with a reference signal of the same frequency as that of the desired odd harmonic component. In FIG. 1 the output of the photodetector 17 is applied to a synchronous detector 18, wherein it is multiplied by a reference signal Sr of the same frequency as the phase modulation frequency $\omega_p$ to generate frequency components corresponding to the sum of and the difference between the photodetector output and the component of the frequency $\omega_p$ (the term with the coefficient $\sin\Delta\Phi$ for n=0) in Eq. (1). At the same time, the other components (including a DC component as well) in Eq. (1) are all provided as the fundamental and higher harmonic components of the frequency $\omega_p$. The output of the synchronous detector 18 is applied to a low-pass filter 19 to cut off the detector output except for the difference component (the DC component), and only the DC component is derived at a proper gain, thereafter being provided as the output of the fiber optic gyro (hereinafter referred to as an FOG output) to a terminal 21.

The FOG output Vo is expressed by the following equation:

$$Vo = I \cdot K_{op} \cdot K_{pd} \cdot J_1(x) \cdot K_{A1} \cdot \sin\Delta\phi \quad (2)$$
$$= K1 \cdot \sin\Delta\phi$$

where $K_{A1}$ is a gain.

The phase difference $\Delta\Phi$ between the two light beams represents a Sagnac phase difference $\Delta\Phi_s$ which is caused by the application of an angular rate $\Omega$ to the optical fiber coil 15, and this phase difference is expressed by the following equation:

$$\Delta\Phi_s = 4\pi RL \cdot \Omega/C\lambda \quad (3)$$

where C is the velocity of light, $\lambda$ is the wavelength of light in a vacuum, R is the radius of the optical fiber coil 15 and L is the length of the optical fiber forming the optical fiber coil 15. Hence the input angular rate $\Omega$ can be detected by measuring the output Vo of the low-pass filter 19.

As described above, when the functions and performance of respective parts of the fiber optic gyro are normal, the input angular rate can be detected by measuring the FOG output Vo. In the case of the prior art, however, even if the fiber optic gyro develops an abnormality and operates at reduced performance, produces no output or continues to output an abnormal voltage, it is impossible to judge from the FOG output alone whether the gyro is normal or abnormal—this incurs the possibility that the system using the fiber optic gyro gets into danger.

SUMMARY OF THE INVENTION

It is therefore an object of the present invention to provide an optical interferometric angular rate meter which is capable of making a self-check to see if it is normal or abnormal.

According to a first aspect of the present invention, odd harmonic components of the phase modulation signal contained in the photoelectric-converted signal from the photodetector are each extracted while changing over the reference signal of the synchronous detector by a self-diagnostic instruction and a check is made to see if the synchronously detected output is within a prescribed range, whereby the angular rate meter is allowed to make a self-diagnosis as to whether it is normal or abnormal.

According to a second aspect of the present invention, second output means is provided to derive a $\cos\Delta\Phi$ component from the photodetector output and the output of the second output means is used as a self-diagnostic signal.

To make a correct self-diagnosis even in the state of an angular rate being applied, the following steps are taken. That is, the invention according to the second aspect is provided with first multiplier means for squaring the output from first output means which derives the $\sin\Delta\Phi$ component from the output of the photodetector, second multiplier means for squaring the output from the second output means and adder means for adding the outputs of the first and second multiplier means, and the output of the adder means is provided as the above-mentioned self-diagnostic signal. By making a check to see if the self-diagnostic signal is within a predetermined range, the fiber optic gyro is allowed to make a self-diagnosis as to whether it is normal or abnormal.

According to a third aspect of the present invention, in a closed loop type fiber optic gyro the reference signal of the synchronous detector means is switched to a reference signal 180° out of phase with the said signal by a diagnosing instruction, the stable point of the closed loop is shifted to a position where the phase difference between the clockwise and counterclockwise light beams is 180° or its odd multiple, and the FOG output at this time is sent to a diagnosing circuit to make a check to see if its frequency (a bias frequency) is within a prescribed range, thereby judging whether the fiber optic gyro is normal or abnormal.

In this instance, it is also possible to employ a method in which the order of the frequency of the reference signal of the synchronous detector is switched by a diagnosing instruction, an even multiple component the phase modulation frequency is synchronously detected and the stable point of the closed loop is shifted to a position where the phase difference between the clockwise and counterclockwise light beams is 90° or its odd multiple. The FOG output at this time is provided to the diagnosing circuit to make a check to see if its frequency (a bias frequency) is within a prescribed range, thereby judging whether the fiber optic gyro is normal or abnormal.

DESCRIPTION OF THE PREFERRED EMBODIMENTS

Figure 1:
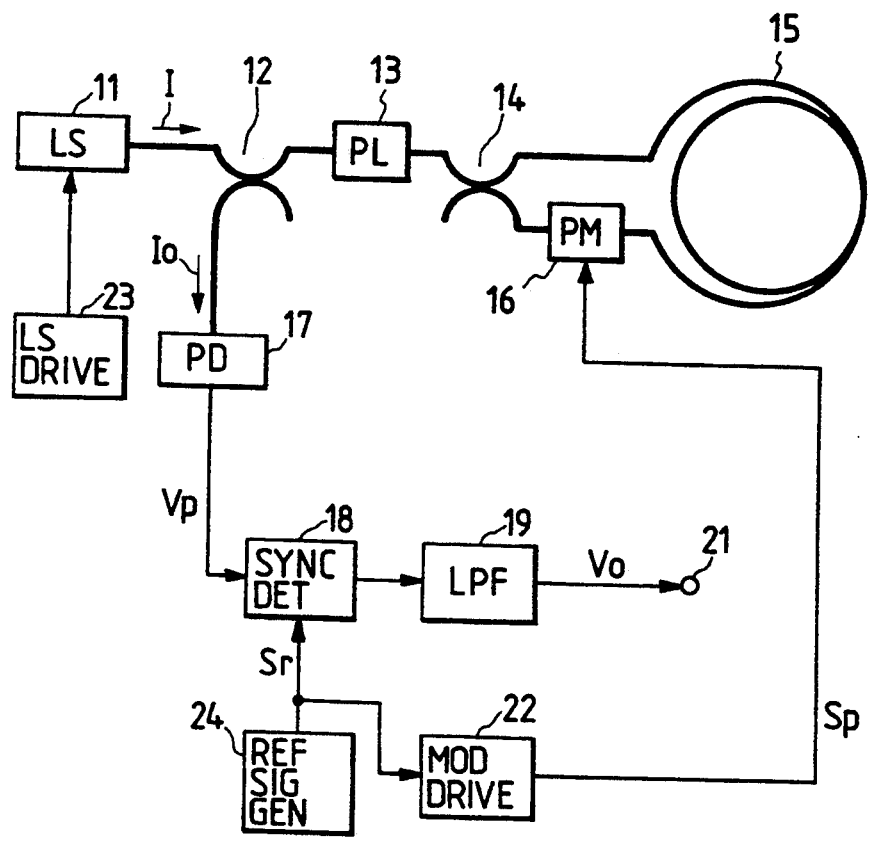
FIG. 1 is a block diagram showing a conventional open loop type fiber optic gyro.
Figure 2:
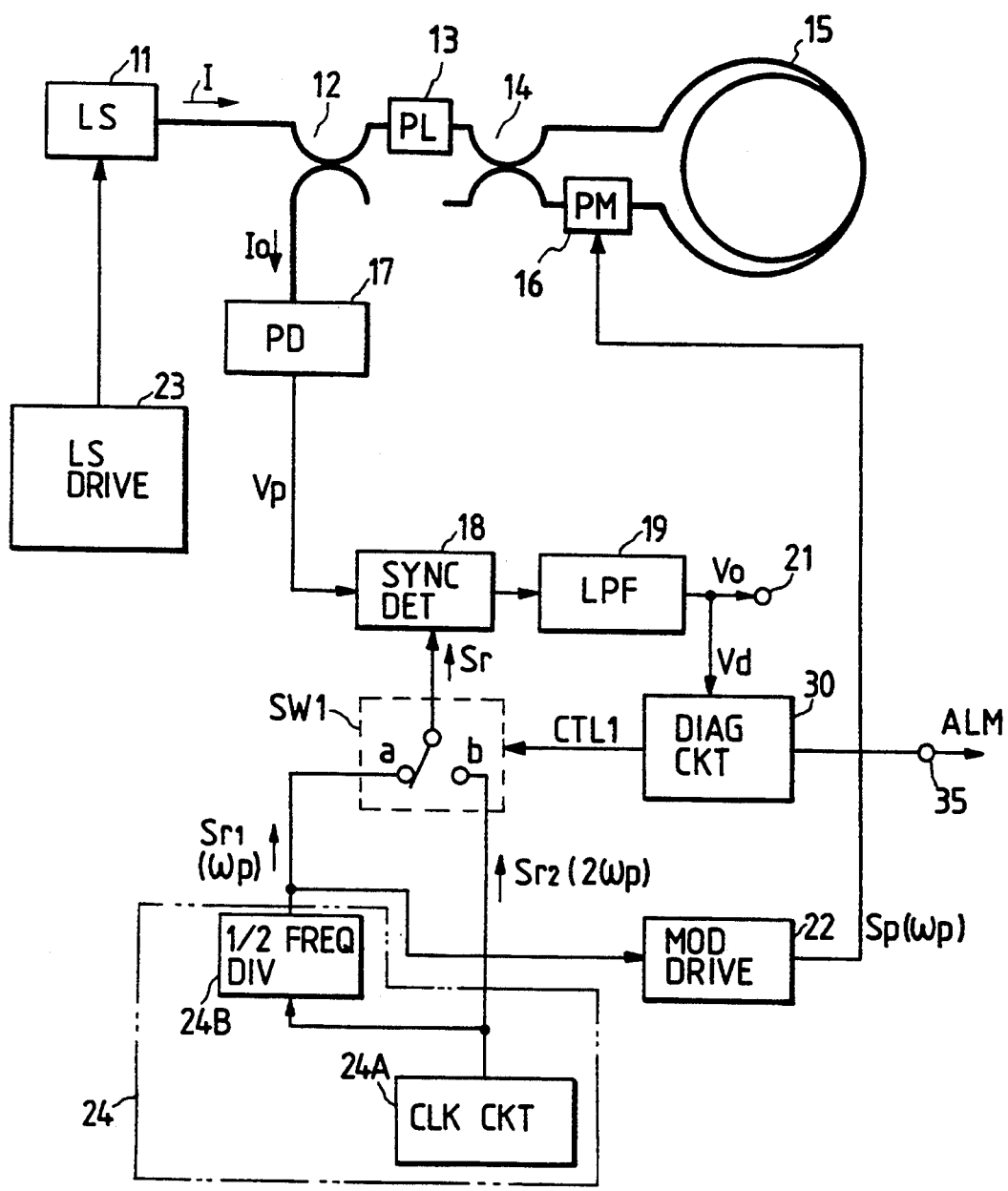
FIG. 2 is a block diagram illustrating an embodiment of the open loop type fiber optic gyro according to the first aspect of the present invention.

FIG. 2 illustrates in block form an embodiment of an open loop type fiber optic gyro according to the first aspect of the present invention, in which the parts corresponding to those in FIG. 1 are identified by the same reference numerals. This embodiment is adapted so that the reference signal Sr, which is supplied to the synchronous detector 18, is switched, by a diagnosis instruction CTL1 from a diagnosis circuit 30, to a reference signal $S_{r2}$ (hereinafter referred to as a secondary reference signal) of a frequency $2\omega_p$ twice higher than the frequency $\omega_p$ of the phase modulation signal Sp which is applied to the phase modulator 16. To perform this, the reference signal generator 24 includes a clock circuit 24A which generates a signal of the frequency $2\omega_p$, and output of the clock circuit 24A is frequency divided by a frequency divider 24B down to ½, providing a signal of the frequency $\omega_p$. This signal is applied to the modulator driver 22 to produce the phase modulation signal Sp of the frequency $\omega_p$. Under the control of the diagnosis instruction signal CTL1 a switch SW1 is switched between the frequency divider 24B and the clock circuit 24A and the output of either one of them is applied as the reference signal Sr to the synchronous detector 18. The switch SW1 is normally connected to a terminal a, i.e. the output side of the frequency divider 24B.

When the switch SW1 is being connected to the terminal a, a signal $S_{r1}$ (hereinafter referred to as a primary reference signal) of the same frequency $\omega_p$ as the phase modulation frequency $\omega_p$ is applied as the reference signal Sr to the synchronous detector 18. As a result, the fundamental harmonic component of the interference light is synchronously detected and provided via the low-pass filter 19 to the output terminal 21. The output Vo at this time is expressed by Eq. (2) and is used as the output of the fiber optic gyro. When no angular rate is being applied to the fiber optic gyro, the aforementioned phase difference $\Delta\Phi$ is zero and the output of the fiber optic gyro expressed by Eq. (2) is zero. Hence a fault of the fiber optic gyro cannot be judged from the output Vo in this instance.

When the switch SW1 is connected to a terminal b by the diagnosis instruction signal CTL1, the secondary reference signal $S_{r2}$ of the frequency $2\omega_p$ twice higher than the frequency $\omega_p$ is applied as the reference signal Sr to the synchronous detector 18. As a result, the second harmonic component of the interference light is synchronously detected and provided via the low-pass filter 19 to the output terminal 21. The output Vo in this case is expressed by the following equation:

$$Vo = K_{op} \cdot K_{pd} \cdot J_2(x) \cdot K_A \cdot \cos\Delta\Phi \quad (4)$$

When the phase difference $\Delta\Phi$ is zero, the second harmonic component output Vo expressed by Eq. (2) takes the maximum value, with $\cos\Delta\Phi = 1$. A diagnosis circuit 30 makes a check to see if the secondary component output, which is a self-diagnosis signal output Vd while no angular rate input is being applied to the fiber optic gyro, is within a prescribed range, and if not, the circuit 30 outputs an alarm signal ALM to a terminal 35.

Figure 3:
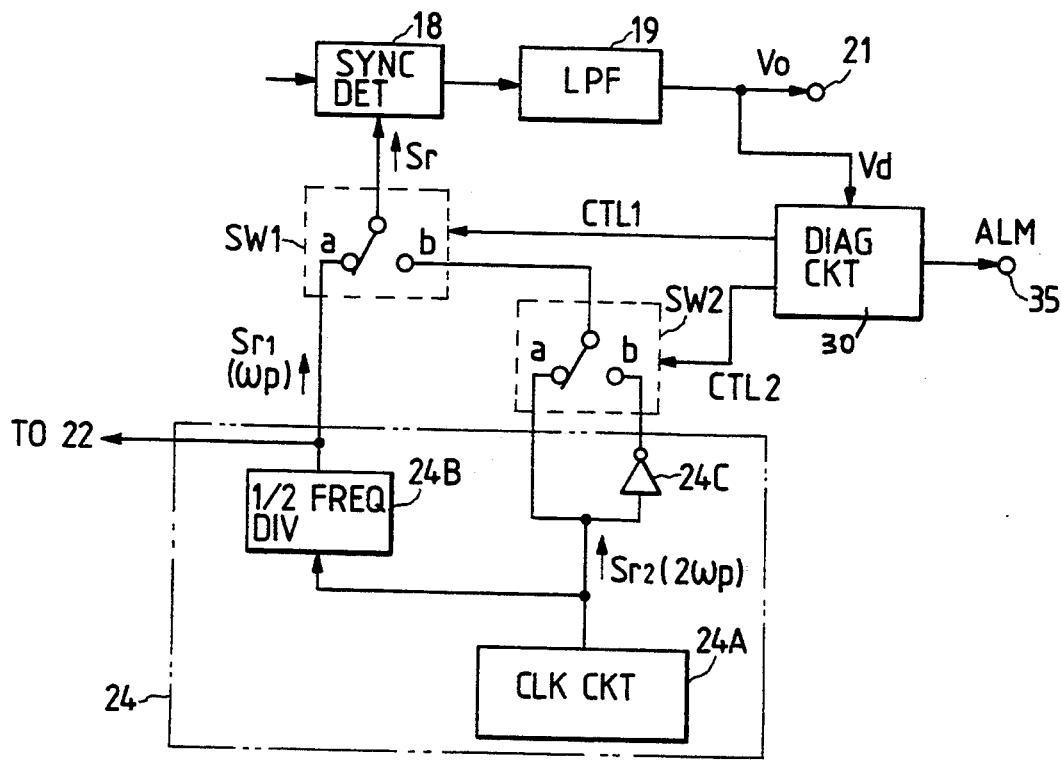
FIG. 3 is a block diagram illustrating the principal part of a modified form of the FIG. 2 embodiment.

FIG. 3 illustrates in block form the principal part of a modified form of the embodiment depicted in FIG. 2, wherein another switch SW2 is provided. The reference signal generator 24 further includes an inverter 24C. The output of the clock circuit 24A is applied intact to a terminal a of the switch SW2 and at the same time it is also provided to a terminal b of the switch SW2 after being phase shifted by 180° by the inverter 24C. The switch SW2 is changed over to the output side of the inverter 24C by a second diagnosis instruction signal CTL2 from the diagnosis circuit 30. As shown in a period A in FIG. 4, the state in which the switch SW1 is connected to the terminal b and the switch SW2 is connected to the terminal a is equivalent to the state in which the SW1 is connected to the terminal b in FIG. 2, and the self-diagnosis signal output Vo expressed by Eq. (2) is provided at the output terminal 21. As shown in a period B, when the switch SW2 is changed over to the terminal b by the second diagnosis instruction signal CTL2 and the phase of the reference signal Sr is reversed, the self-diagnosis signal output Vo which is equal in magnitude to that in the above but opposite in polarity appears at the output terminal 21.

Figure 4:
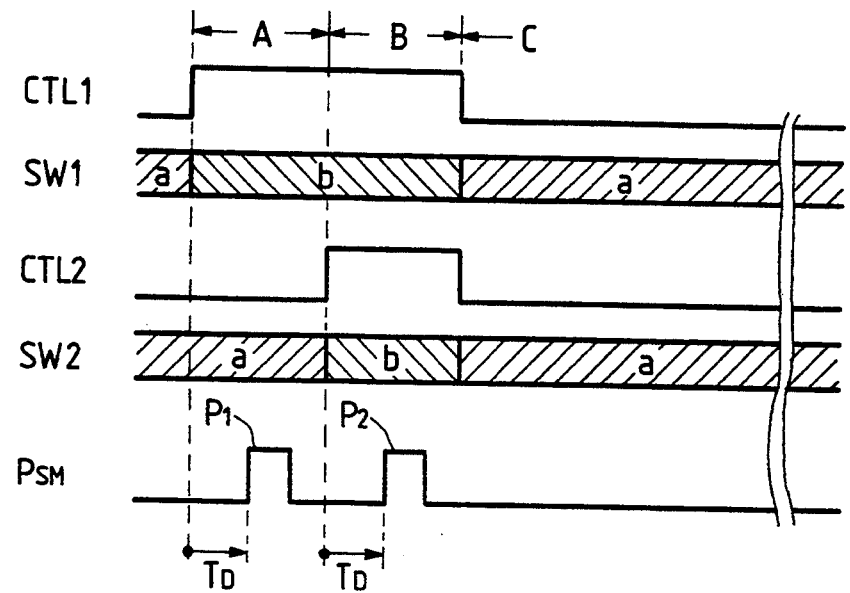
FIG. 4 is a timing chart for explaining the operation of the FIG. 3 embodiment.

Next, as shown in a period C in FIG. 4, when the switch SW1 is connected to the terminal a (but the switch SW2 may be connected to either one of the terminals a and b), a detected output of the angular rate that is applied to the fiber optic gyro is obtained at the terminal 21. The diagnosis circuit 30 makes a check to see if the polarity and absolute value of the self-diagnosis signal output of each of the two systems are within prescribed range, and it outputs the alarm signal ALM upon detection of an abnormality. Such an arrangement eliminates the possibility that output values occurring when there is a failure fall within a prescribed range by chance as in the case of using the one switch system in FIG. 2, and this enhances the reliability of the self-diagnosis feature. For example, where the level of the self-diagnosis signal output Vd happens to be fixed within a predetermined range of the positive polarity due to a failure of an electric circuit irrespective of the light detected output Io when the switch SW2 is held on the terminal a side, the signal Vd will not go negative even if the switch SW2 is changed over to the terminal b side, and hence the occurrence of the failure can be detected.

Figure 5:
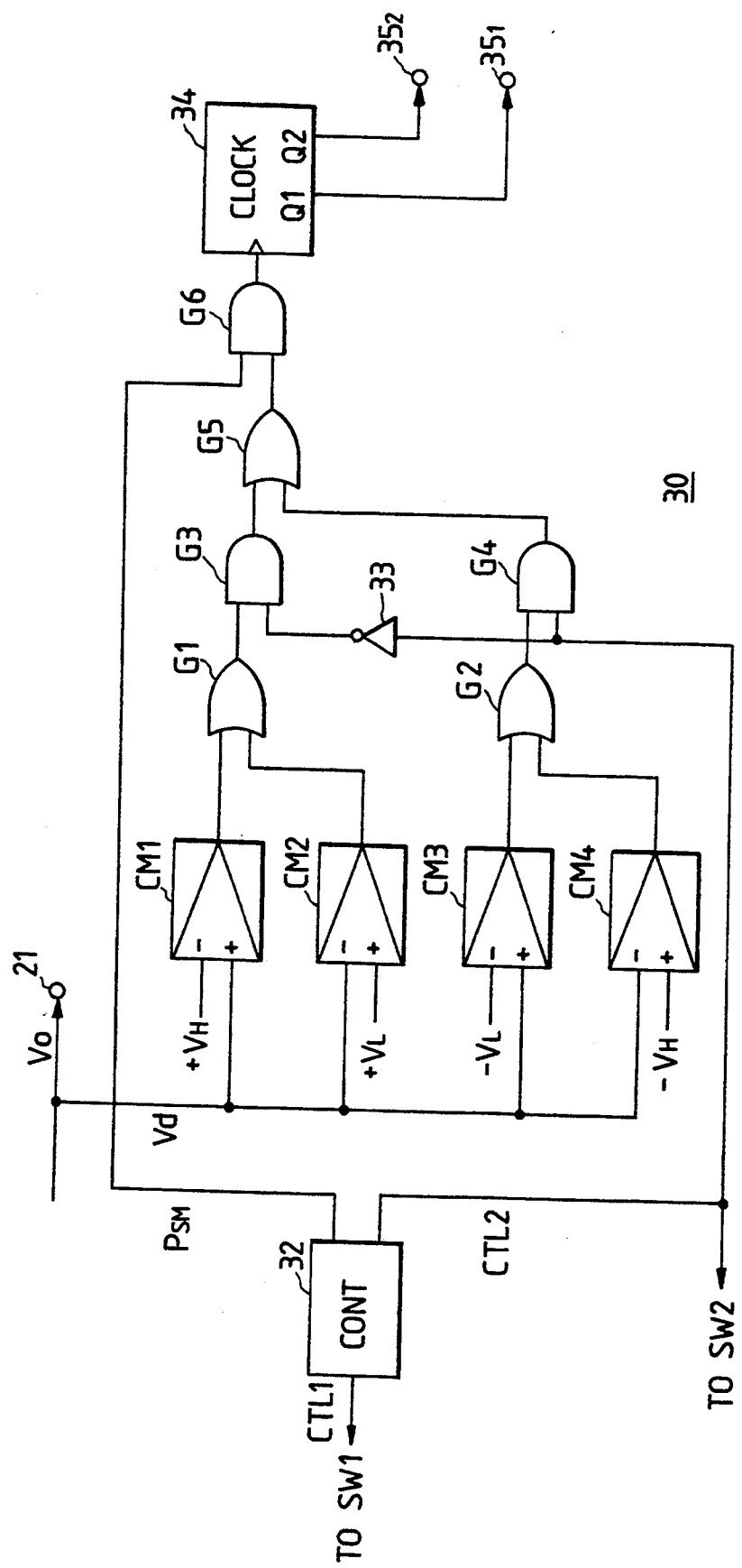
FIG. 5 is a block diagram showing an example of a self-diagnosing circuit.

FIG. 5 is a block diagram illustrating an example of the construction of the diagnosis circuit 30 which generates the diagnosis instruction signals CTL1 and CTL2 and makes a check to see if the self-diagnosis signal output is within a predetermined range. In this example the diagnosis circuit 30 is made up of a controller 32 which outputs the diagnosis instruction signals CTL1 and CTL2 and sampling signal $P_{SM}$, comparators CM1 through CM4 which compare the self-diagnosis signal output Vd with reference levels $+V_H$, $+V_L$, $-V_L$ and $-V_H$, respectively, an inverter 33, gates G1 through G6 and a counter 34.

The terminal 21 is supplied with the detected output Vo of the angular rate applied to the fiber optic gyro. The comparator CM1 outputs a "0" when the positive self-diagnosis signal output Vd, which is the detected output Vo while no angular rate is being applied to the fiber optic gyro, is lower than the reference voltage $V_H$ which defines the upper limit level of the normal signal output Vd. When the self-diagnosis signal output Vd is higher than the reference voltage $V_H$, the comparator CM1 outputs a "1". The comparator CM2 outputs a "1" or "0", depending on whether the positive self-diagnosis signal output Vd is higher or lower than the reference voltage $V_L$ which defines the lower limit level of the normal signal output Vd. The outputs of the comparators CM1 and CM2 are provided via the OR gate G1 to the AND gate G3.

On the other hand, the comparator CM3 outputs a "1" when the negative self-diagnosis signal output Vd is lower in absolute value than the reference voltage $-V_L$ (i.e. within the range from $-V_L$ to 0) which defines the lower limit level of the normal signal output Vd. When the signal output Vd is higher than the reference voltage $-V_L$ on the negative side, the comparator CM3 outputs a "0". The comparator CM4 outputs a "0" when the negative self-diagnosis signal output Vd is lower in absolute value than the reference voltage $-V_H$ (i.e. within the range from $-V_H$ to 0) which defines the upper limit level of the normal signal output Vd. When the signal output Vd is higher than the reference voltage $-V_H$ on the negative side, the comparator CM4 outputs a "1". The outputs of the comparators CM3 and CM4 are provided via the OR gate G2 to the AND gate G4.

When the second diagnosis instruction signal CTL1 that is applied from the controller 32 to the switch SW2 is a "0" (that is, when the switch SW2 is being connected to the terminal a), the AND gate G3 is enabled, through which the OR of the outputs from the comparators CM1 and CM2 is provided via the OR gate G5 to the AND gate G6. When the second diagnosis instruction signal CTL2 is a "1" (that is, when the switch SW2 is being connected to the terminal b), the AND gate G4 is enabled and the OR of the outputs from the comparators CM3 and CM4 is provided via the OR gate G5 to the AND gate G6.

The AND gate G6 is enabled when a self-diagnosis signal output sampling pulse $P_{SM}$ which is generated by the controller 32 and applied to the AND gate G6 goes "high" (a pulse $P_1$) as shown in the period A in FIG. 4. At the timing of the pulse $P_1$ the compared outputs of the comparators CM1 and CM2 are provided to the counter 34, and as shown in the period B, the compared outputs of the comparators CM3 and CM4 are provided to the counter 34 at the timing of a pulse $P_2$. When the fiber optic gyro is normal, the outputs of the comparators CM1 through CM4 remain "low" and the outputs Q1 and Q2 of the counter 34 both remain "low". When the fiber optic gyro is abnormal, the output Q1 or both of the outputs Q1 and Q2 go "high" on the basis of a "high" output signal from any one of the comparators CM1 and CM2, CM3 and CM4, and the "high" Q output is provided to a terminal 35 ($35_1$, $35_2$), as the alarm signal ALM indicating an abnormality of the fiber optic gyro. The counter 34 needs to reset its outputs prior to the self-diagnosis. While the FIG. 5 embodiment has been described in the form of hardware, the above-described feature could also easily be carried out in the form of software by converting the self-diagnosis signal Vd to a digital value and loading it into a computer.

Although in the above the fundamental harmonic component of the same frequency as the phase modulation frequency $\omega_p$ is detected from the output of the photodetector 17, it is also possible to detect other odd harmonic components. Similarly, in the case of making a self-diagnosis, an even harmonic component may also be detected from the output of the photodetector 17 in place of the second harmonic component which is a frequency component twice higher than the phase modulation frequency $\omega_p$.

In the above embodiment the diagnosis circuit 30, which makes a check to see if the self-diagnosis signal output Vd is within a prescribed range, is provided in the fiber optic gyro, but it may also be provided in a host system using the fiber optic gyro. The controller 32 for generating the diagnosis instruction signals CTL1 and CTL2 may also be provided outside of the diagnosis circuit 30.

Figure 6:
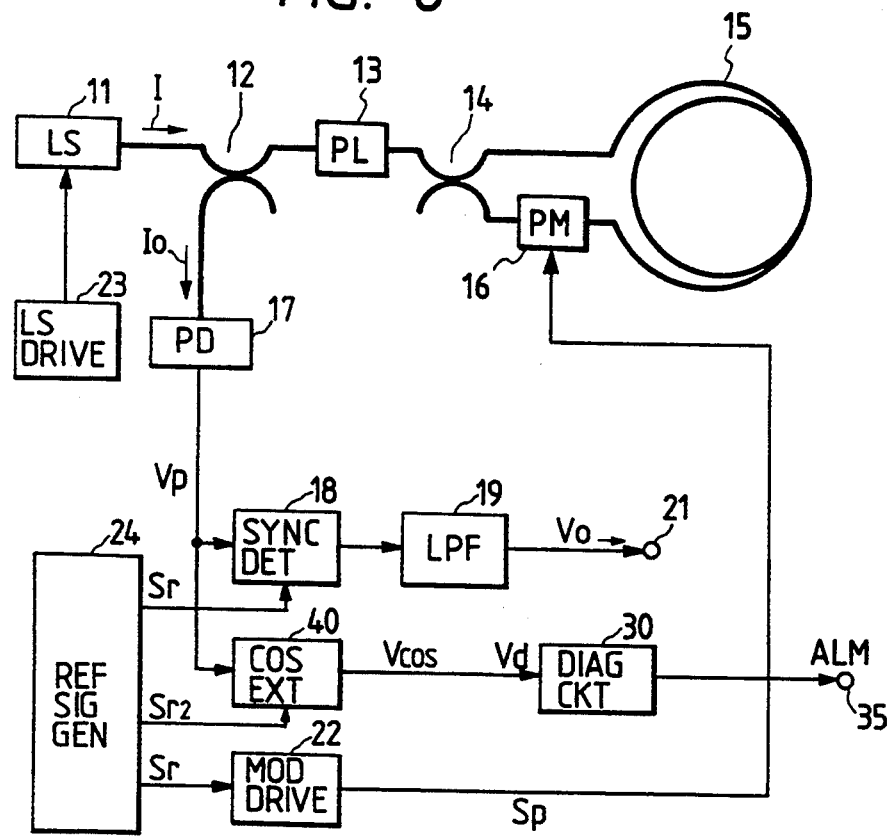
FIG. 6 is a block diagram illustrating an embodiment according to the second aspect of the present invention.

FIG. 6 illustrates an embodiment of the open loop fiber optic gyro according to the second aspect of the present invention, in which the parts corresponding to those in FIG. 1 are identified by the same reference numerals. In the embodiments of FIGS. 2 and 3 the frequency of the reference signal Sr which is applied to the synchronous detector 18 for detecting the input angular rate is changed over to provide a selected one of the detected angular rate signal Vo and the self-diagnosis signal Vd to the output terminal 21, but in the embodiment of FIG. 6 a cos-component extractor 40 for detecting the self-diagnosis signal is provided separately of the synchronous detector for detecting the angular rate signal.

The respective Bessel functions $J_n(x)$ in Eq. (1) undergo undulatory variations in different phases so that they are maximum at sequentially displaced or shifted positions of x. To detect the angular rate component $\sin\Delta\Phi$ from the output of the photodetector 17 expressed by Eq. (1) as mentioned previously, a desired odd harmonic component $(2n+1)\omega_p$ of the fundamental frequency $\omega_p$ which has $\sin\Delta\Phi$ as its coefficient is detected by the synchronous detector 18 and the low-pass filter 19. In contrast thereto, the self-diagnosis signal is generated by a desired even harmonic component $2n\omega_p$ ($n \geq 0$) in Eq. (1) which has $\cos\Delta\Phi$ as its coefficient or a weighted combination of plural even harmonic components which have $\cos\Delta\Phi$ as their coefficients. These components which have $\cos\Delta\Phi$ as their coefficients will hereinafter be referred to as $\cos\Delta\Phi$ components or simply as cos-components, and the components which have $\sin\Delta\Phi$ as their coefficients will hereinafter be referred to as $\sin\Delta\Phi$ components or simply as sin-components.

In the embodiment of FIG. 6 the cos-component extractor 40 is made up of a synchronous detector and a low-pass filter which extract the $\cos\Delta\Phi$ component through use of, for example, the secondary reference signal $S_{r2}$ of the frequency $2\omega_p$ which is available from the reference signal generator 24. Alternatively, the cos-component extractor 40 may be formed so that only the second harmonic component (i.e. the $2\omega_p$ component) in Eq. (1) is extracted by a band-pass filter and its output is rectified and smoothed to obtain the $\cos\Delta\Phi$ component. In such an instance, no reference signal is needed for the extractor 40.

The output $V_{cos}$ of the cos-component extractor 40 which thus extracts the $\cos\Delta\Phi$ component from the output of the photodetector 17 is expressed, as is the case with Eq. (2), by the following equation:

$$V_{cos}=K_{cos}\cos\Delta\Phi \qquad (5)$$

When the angular rate $\Omega$ is not being applied to the fiber optic gyro, the phase difference $\Delta\Phi$ is zero and the FOG output V0 expressed by Eq. (2) is zero. Hence the output V0 at the terminal 21 cannot be used to determine whether the FOG performance is normal or abnormal. On the other hand, the output $V_{cos}$ expressed by Eq. (5) becomes maximum, with $\cos\Delta\Phi=1$. The proportional coefficient $K_1$ in Eq. (2) and the proportional coefficient $K_{cos}$ in Eq. (5) bear a proportional relation. Hence it can be determined whether the fiber optic gyro is normal or not, by making a check to see if the output $V_{cos}$, which is provided as the self-diagnosis signal output Vd to the self-diagnosis circuit 30 in the state of no angular rate being applied to the fiber optic gyro, is within the prescribed range. In this case, however, it is necessary that Bessel coefficients contained in respective signals be controlled to be constant.

The variable x of the Bessel function is given by $x=2A\sin\pi f_p\tau$ as referred to previously, but since the phase modulation index A at the phase modulator 16 is susceptible to the influence of temperature, the variable x is also liable to vary with temperature. Now, a description will be given, with reference to FIG. 7, of an example in which the value of the variable x is chosen such that the Bessel function $J_{2n+1}(x)$, which is the coefficient of an odd harmonic component, is allowed to take a maximal value so as to prevent the Bessel function from undergoing a substantial change. For example, in the case of using a signal having a third harmonic frequency $3\omega_m$ as the reference signal Sr for the synchronous detection of the angular rate, since the Bessel function $J_3(x)$ becomes maximal when the variable x is about 4.20, the modulation index A of the phase modulation $P(t) = A\sin\omega_p t$ is properly selected so that the variable x becomes 4.20. In contrast thereto, in this example second and fourth Bessel functions $J_2(x)$, $J_4(x)$ are combined, with suitable weights, so that the self-diagnosis signal output Vd which is derived from the extracted cos-component also takes a maximal value when the variable x is 4.20. A function $J_2 + 2.06 J_4$, which is obtained by adding the Bessel functions $J_2$ and $J_4$ weighted by 1 and 2.06, becomes maximal when the variable x is 4.20.

Figure 7:
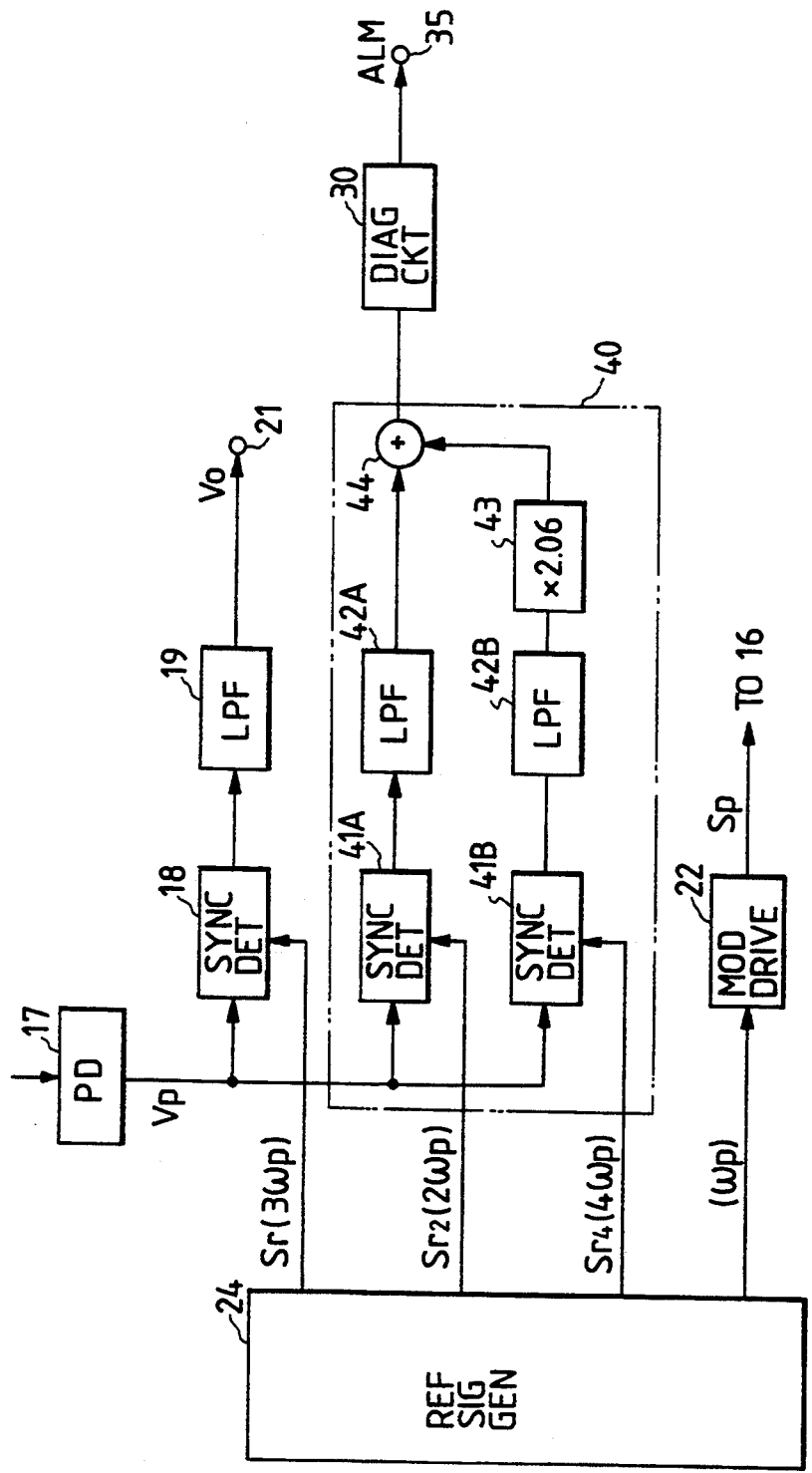
FIG. 7 is a block diagram showing the principal part of an embodiment which employs another example of a cos-component extractor 40 in the FIG. 6 embodiment.

In FIG. 7 there are shown only a modified form of the cos-component extractor 40 of FIG. 6 and the associated circuit elements. The synchronous detector 18 for detecting, as an angular rate component (i.e. the $\sin\Delta\Phi$ component), the third harmonic component (the component of the frequency $3\omega_p$) in the output of the photodetector 17 performs the synchronous detection with the reference signal Sr of a frequency which is three times higher than the phase modulation frequency $\omega_p$ and is provided from the reference signal generator 24, and the low-pass filter 19 removes the alternating components to extract, as the FOG output V0, the angular rate component converted into a DC component (i.e., $KJ_3\sin\Delta\Phi$). On the other hand, the cos-component extractor 40 synchronously detects components of second and fourth harmonics $2\omega_p$ and $4\omega_p$ in the output of the photodetector 17 by synchronous detectors 41A and 41B which are supplied with reference signals $S_{r2}$ and $S_{r4}$ of the frequencies $2\omega_p$ and $4\omega_p$ from the reference signal generator 24, respectively, and low-pass filters 42A and 42B extract second and fourth harmonic components, that is, $KJ_2\cos\Delta\Phi$ and $KJ_4\cos\Delta\Phi$, respectively. The fourth harmonic component thus extracted is multiplied by 2.06 in a multiplier. The multiplied output is added to the second harmonic component in an adder 44 and the added output is provided as the cos-component output $V_{cos}$.

The method that uses the output $V_{cos}$ as the self-diagnosis signal output Vd to make a self-diagnosis is not as high in accuracy, since the output changes when the input angular rate $\Omega$ is applied, but this method can be utilized as a simple and easy method for making a check to see if the fiber optic gyro is operating at intended performance.

Figure 8A:
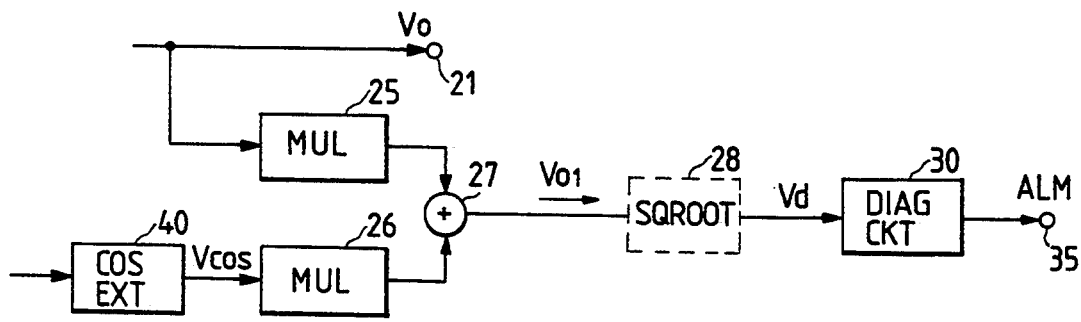
FIG. 8A is a block diagram showing the principal part of an arrangement intended to lessen the influence of the input angular rate on the self-diagnostic signal in the FIG. 6 embodiment.

To permit a highly accurate or precise self-diagnosis, the output Vo expressed by Eq. (2) and the output $V_{cos}$ expressed by Eq. (5) are squared by multipliers 25 and 26, respectively, and both squared outputs are added by an adder 27 as depicted in FIG. 8A. The output $V_{o1}$ of the adder 27 is expressed by the following equation:

$$V_{o1} = V_0^2 + V_{cos}^2$$

Now, assuming that circuit gains and the like are chosen in initialization so that $K = K_1 = K_{cos}$, the output $V_{o1}$ becomes as follows:

$$V_{o1} = K^2 \cdot (\cos^2\Delta\Phi + \sin^2\Delta\Phi) = K^2 \quad (6)$$

and the output $V_{o1}$ is not influenced by the input angular rate. Hence, even if the angular rate is being applied, it is possible to check the fiber optic gyro for abnormality by making a self-check in the self-diagnosis circuit 30 to see if the value of the output $V_{o1}$ provided thereto as the self-diagnosis signal output Vd is within the prescribed range. The same results could also be obtained in the case where a square root circuit 28 is provided at the output side of the adder 27 as indicated by the broken line in FIG. 8A and the square root of the output $V_{o1}$ is used as the self-diagnosis signal output Vd. The output of the square root circuit 28 is K.

Figure 8B:
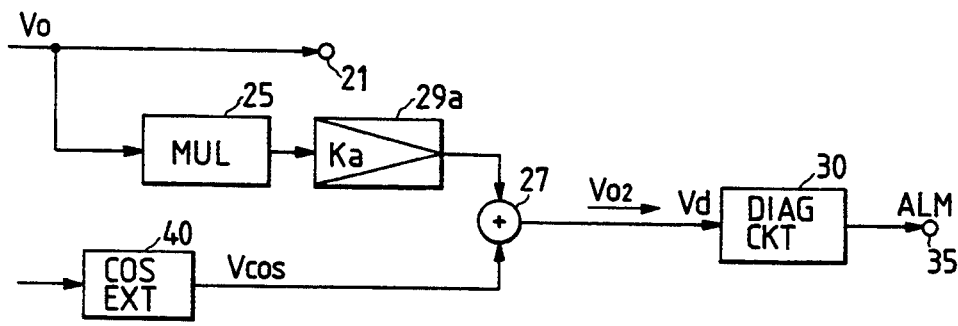
FIG. 8B is a block diagram showing the principal part of another arrangement intended to lessen the influence of the input angular rate on the self-diagnostic signal.
Figure 8C:
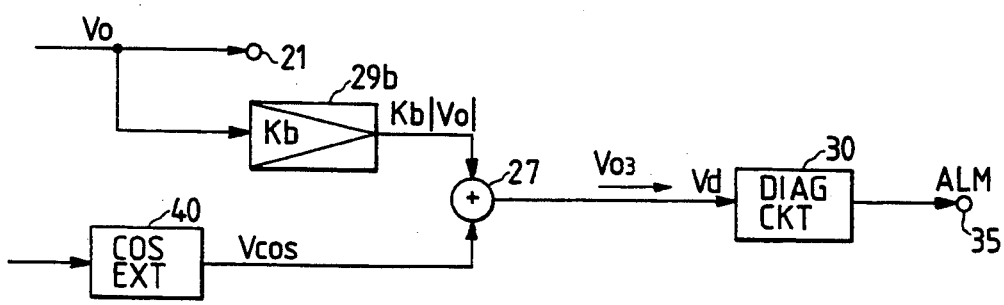
FIG. 8C is a block diagram showing the principal part of still another arrangement intended to lessen the influence of the input angular rate on the self-diagnostic signal.

The embodiment of FIG. 8A is ideally capable of completely eliminating the influence of the input angular rate but may also be so constructed as to lessen the influence of the input angular rate as predetermined within the practical range of the phase difference $\Delta\Phi$. Two examples of such a construction are shown in FIGS. 8B and 8C corresponding to FIG. 8A. As depicted in FIG. 8B, the output Vo is squared by the multiplier 25 and the output signal of an amplifier 29a which multiplies the squared output by Ka and the output $V_{cos}$ of the cos-component extractor 40 are added by the adder 27. The added output $V_{o2}$ of the adder 27 is given by the following equation:

$$V_{o2} = V_{cos} + Ka \cdot V_0^2 \quad (7)$$

Assuming that circuit gains and the like are chosen in initialization so that $K = K_1^2 = K_{cos}$, the output $V_{o2}$ becomes as follows:

$$V_{o2} = K \cdot (\cos\Delta\Phi + Ka \cdot \sin^2\Delta\Phi) \quad (8)$$

Figure 9A:
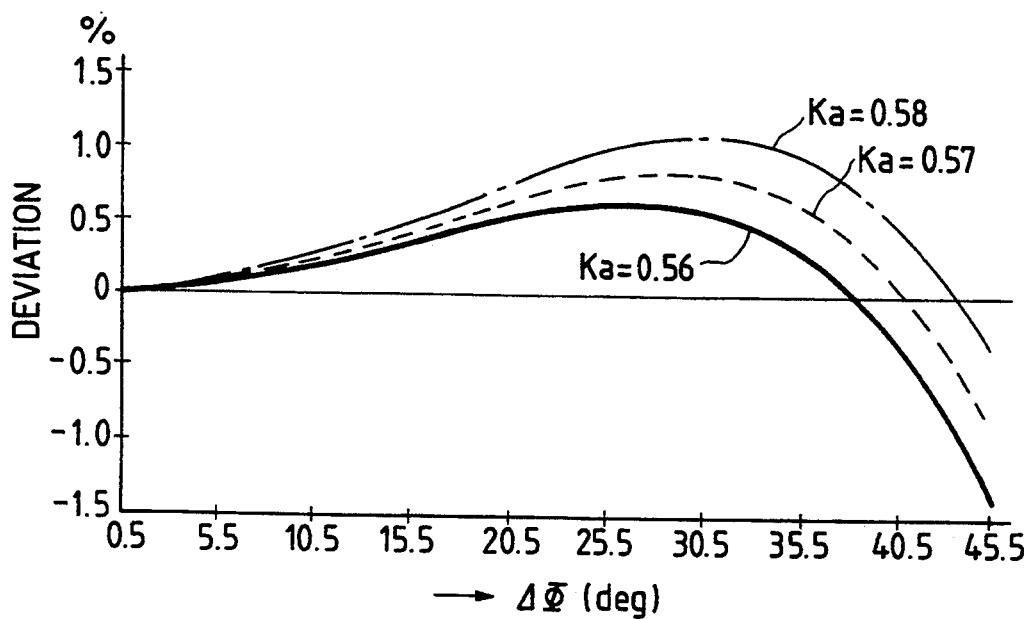
FIG. 9A is a graph showing the deviation of the self-diagnostic signal with respect to the phase difference $\Delta\Phi$ in the FIG. 8B example.

In this example, as is evident from Eq. (8), a decrease in the $\cos\Delta\Phi$ component by the occurrence of the phase difference $\Delta\Phi$ is compensated for by the $\sin^2\Delta\Phi$ component, and by a suitable selection of the value Ka to adjust the compensation value, the influence of the input angular rate on the self-diagnosis signal can be lessened. FIG. 9A is a graph showing, in percentage, deviations of the self-diagnosis signal level for respective phase differences $\Delta\Phi$ within 45° from the self-diagnosis signal level corresponding to the phase difference $\Delta\Phi = 0$ in the case where Ka is 0.56, 0.57 and 0.58 in the example of FIG. 8A. As is seen from this graph, it is the curve of Ka = 0.57 that is smallest in the maximum value of the absolute value of the deviation in the range in which the phase difference $\Delta\Phi$ is less than 45°.

In the case of FIG. 8C, an absolute value amplifier 29b multiplies an absolute value of the output Vo by Kb, and the result is added by the adder 27 to the output $V_{cos}$ of the cos-component extractor 40. The output $V_{o2}$ of the adder 27 is given by the following equation:

$$V_{o3} = V_{cos} + Kb |V_0| \quad (9)$$

Supposing that circuit gains and the like are chosen in initialization so that $K = K_1 = K_{cos}$, the output $V_{o3}$ becomes as follows:

$$V_{o3} = K \cdot (\cos\Delta\Phi + Kb |\sin\Delta\Phi|) \quad (10)$$

Figure 9B:
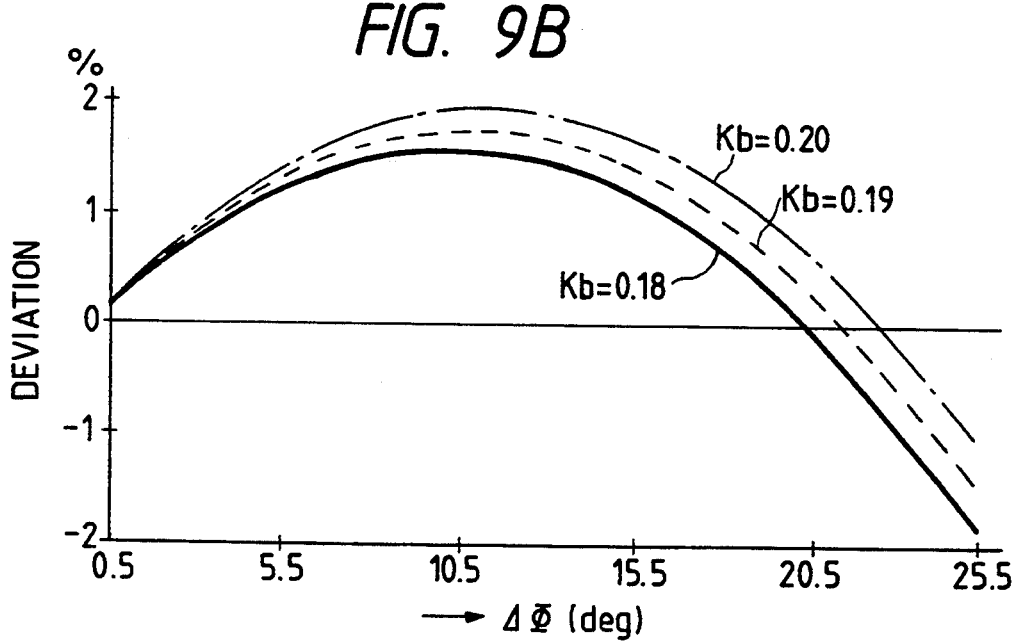
FIG. 9B is a graph showing the deviation of the self-diagnostic signal with respect to the phase difference $\Delta\Phi$ in the FIG. 8C example.

In this example, as is evident from Eq. (10), a decrease in the $\cos\Delta\Phi$ component by the occurrence of the phase difference $\Delta\Phi$ is compensated for by the absolute value of the $\sin\Delta\Phi$ component. By a suitable selection of the value Kb to adjust the compensation value, the influence of the input angular rate on the self-diagnosis signal can be lessened. FIG. 9B is a graph showing, in percentage, deviations of the self-diagnosis signal level for respective phase differences $\Delta\Phi$ within 25° from the self-diagnosis signal level corresponding to the phase difference $\Delta\Phi = 0$ in the cases where Kb is 0.18, 0.19 and 0.20 in the example of FIG. 8B. According to this graph, it is the curve of Kb = 0.19 that is smallest in the maximum value of the absolute value of the deviation in the range in which the phase difference $\Delta\Phi$ is less than 25°. The method of FIG. 8C is lower in the accuracy of the self-diagnosis signal than in the case of FIG. 8B but is a simple and easy method and can be utilized for a low-precision fiber optic gyro.

In the embodiments of FIGS. 6 and 7 the self-diagnosis circuit 30, which is used to determine whether the level of each self-diagnosis signal Vd is within a prescribed range, can easily be formed by, for instance, window comparators each of which has positive and negative reference levels with respect to an ideal value of the respective self-diagnosis signal level and outputs a logical value, for example, a "0" or "1", depending upon whether the self-diagnosis signal level is within the reference level or not, as is the case with the example of FIG. 5. This feature can be equipped in the host system using the fiber optic gyro but it may also be incorporated in the fiber optic gyro itself. In the embodiments of FIGS. 8A, 8B and 8C the diagnosis circuit 30 may be formed by the window comparators of the positive polarity side in FIG. 5. The calculations or arithmetic operations in the above description can be executed by hardware and it is also possible to process the sin $\Delta\Phi$ and cos $\Delta\Phi$ components by a computer, dynamic support program or similar software by converting them to digital form.

While in the above the present invention has been described as being applied to the open loop fiber optic gyro, the invention is also applicable to a closed loop fiber optic gyro as described below.

Figure 10:
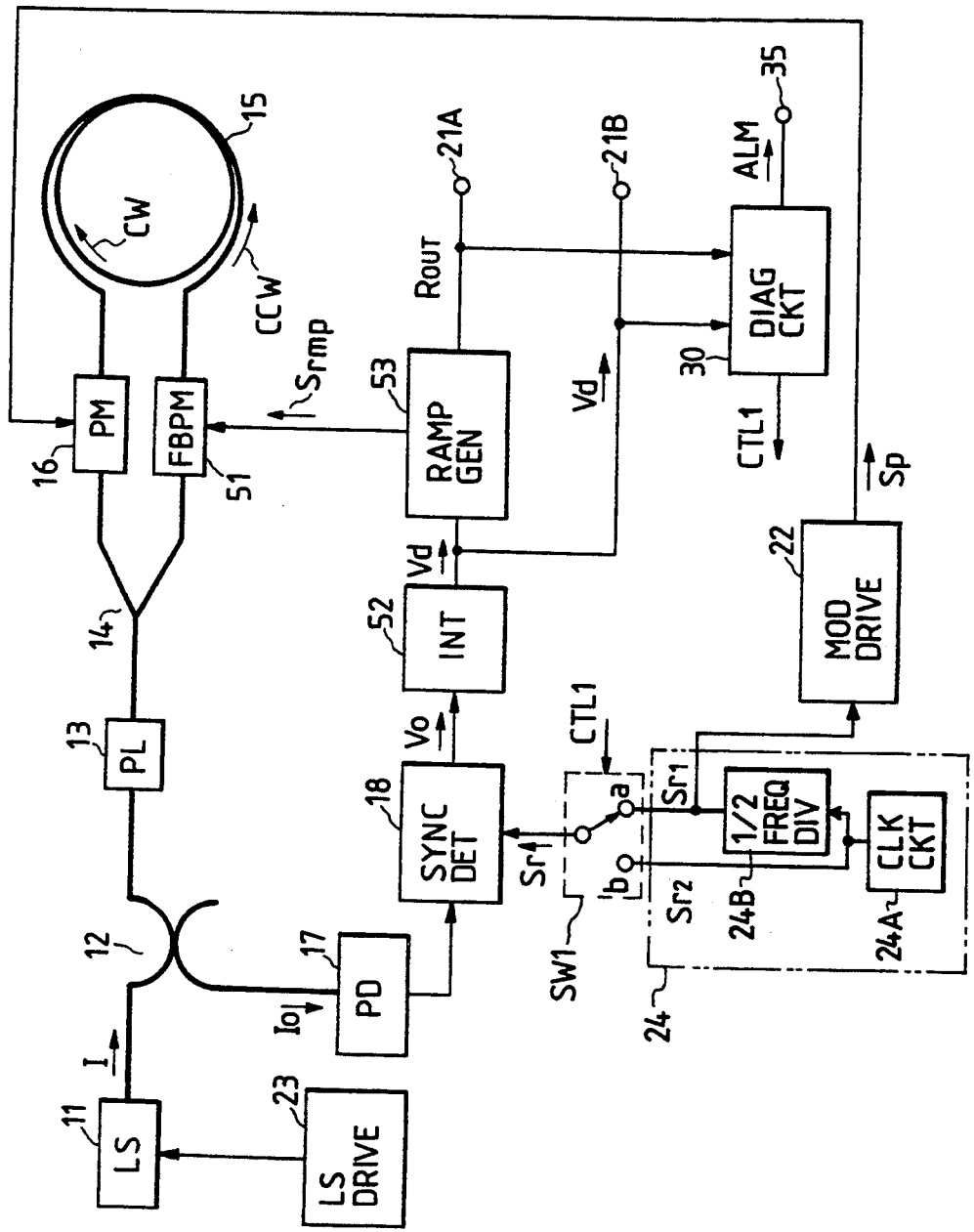
FIG. 10 is a block diagram illustrating an embodiment of a closed loop type fiber optic gyro embodying the present invention.

Referring now to FIG. 10, the light I from the light source 11 is supplied via the optical coupler 12, the polarizer 13 and the optical coupler 14 to the opposite ends of the optical fiber coil 15. The clockwise and counterclockwise light beams CW and CCW which propagate through the optical fiber coil 15 are phase modulated by the phase modulator 16 placed at one end of the optical fiber coil 15. The phase-modulated CW and CCW light beams are combined by the optical coupler 14 and interfere with each other. The interference light is again provided via the polarizer 13 to the optical coupler 12, from which it is branched to the photodetector 17. Letting the phase modulation by the phase modulator 16 be represented by $P(t)=A\sin\omega_p t$, the output Vp of the photodetector 17 in this instance is expressed by Eq. (1) as in the above-described embodiments.

The output of the photodetector 17 is input into the synchronous detector 18 (which is assumed to include the low-pass filter 19 for removing the AC component in FIG. 2, for instance), wherein the same component as that of the phase modulation frequency $\omega_p$, that is, the fundamental frequency component in Eq. (1), is extracted by a synchronous detection with the reference signal Sr from the reference signal generator 24. The phase difference $\Delta\Phi$ between the two light beams is expressed as follows:

$$\Delta\Phi = \Delta\Phi_s + \Delta\Phi_f \quad (11)$$

where $\Delta\Phi_s$ is a Sagnac phase difference which is caused by the application of the angular rate $\Omega$ to the optical fiber coil 15 about its axis as is the case with the above and which is given by Eq. (3).

Figure 11A:
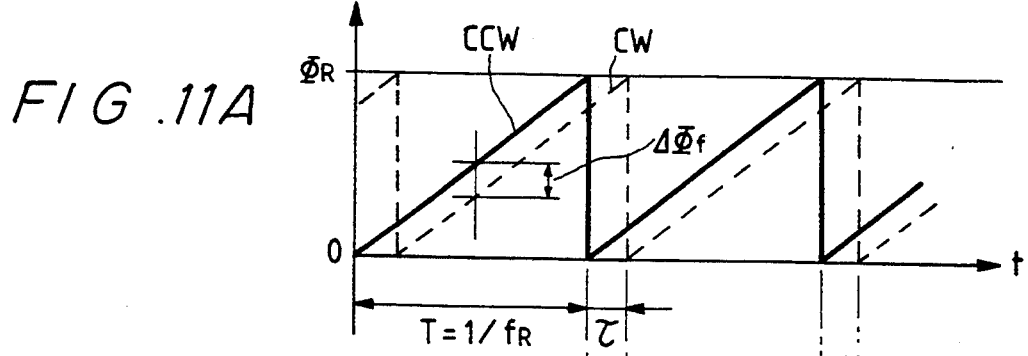
FIGS. 11A and 11B are waveform diagrams showing feedback phases $\Phi_r$ of the clockwise and counterclockwise light beams and their feedback phase difference $\Delta\Phi_r$, which occur in a feedback phase modulator 51 in FIG. 10.
Figure 11B:
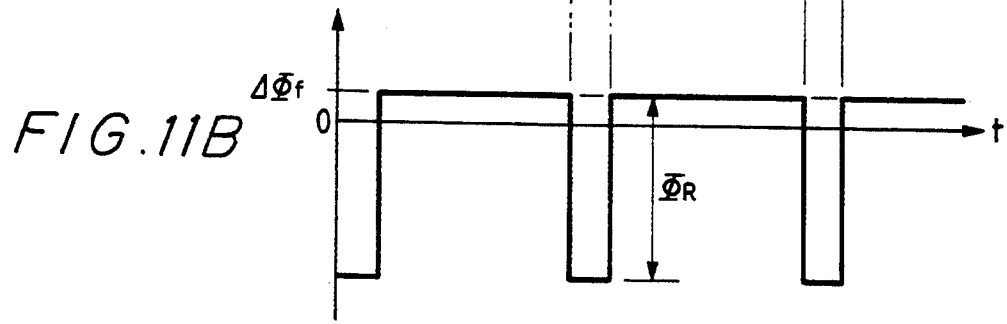

On the other hand, the phase difference $\Delta\Phi_f$ is one that is developed by shifting the phase of each light beam at a fixed rate by a feedback phase modulator 51 disposed at one end of the optical fiber coil 15. In practice, a ramp signal $S_{rmp}$ is applied to the feedback phase modulator 51 to cause it to shift the phase of light. Upon application of the ramp signal $S_{rmp}$ to the feedback phase modulator 51, the CCW light beam develops phase shift as indicated by the solid line in FIG. 11A, whereas the CW light beam is similarly phase shifted after the time $\tau$ for the propagation of light through the optical fiber coil 15, as indicated by the broken line. As a result, the two light beams have a fixed phase difference $\Delta\Phi_f$ as shown in FIG. 11B. Now, if the ramp signal $S_{rmp}$ is applied to the feedback phase modulator 51 so that a maximum deviation $\Phi_R$ of the phase shift is $2\pi k$ (where k is an integer), the phase difference $\Delta\Phi_f$ between the two light beams becomes as follows:

$$\Delta\Phi_f = (2\pi n_a L/C) \cdot k \cdot f_R \quad (12)$$

where $f_R$ is the frequency of the ramp signal $S_{rmp}$ and $n_a$ is the refractive index of the optical fiber. By applying the output of the synchronous detector 18 via an integrator 52 to a ramp signal generator 53 so that the phase difference $\Delta\Phi_f$ is opposite in polarity to the Sagnac phase difference $\Delta\Phi_s$ and equal thereto in magnitude or differs therefrom by $2m\pi$, the input to the integrator 52, that is, the output Vo of the synchronous detector 18 expressed by Eq. (2) converges to zero, establishing a closed loop. As a result, the operating point of the closed loop in its balanced condition during the detection of the angular rate is a position substantially corresponding to $\Delta\Phi = 0 \pm 2m\pi$, where m is an integer. The closed loop is usually operated at a point where m=0. Hence, sin $\Delta\Phi$ in Eq. (2) is substantially reduced to zero, providing $\Delta\Phi_s = -\Delta\Phi_f$. Substituting Eqs. (3) and (12) into this relation, the following relation holds:

$$f_R = -(2R/n_a\lambda k) \cdot \Omega \quad (13)$$

Measuring the frequency $f_R$ of the ramp signal $S_{rmp}$ by this equation, the input angular rate $\Omega$ can be detected since $2R/(n_a\lambda k)$ is a proportional constant. Incidentally, k is usually set to a "1". Accordingly, Eq. (13) becomes as follows:

$$f_R = -(2R/n_a\lambda) \cdot \Omega \quad (13)$$

Letting the gain of the ramp signal generator 53 be represented by $K_{RG}$, the ramp signal $S_{rmp}$ of a repetition frequency $f_R = k_{RG}Vd$ proportional to the output Vd of the integrator 52 is available from the ramp signal generator 53. The ramp signal $S_{rmp}$ is applied to the feedback phase modulator 51, and at the same time a rectangular ROG output signal $R_{OUT}$ of the same frequency as that of the ramp signal $S_{rmp}$ is provided to an output terminal 21A. The output Vd of the integrator 52 is also provided to an output terminal 21B as required. Since the output Vd of the integrator 52 has a level corresponding to the detected angular rate $\Omega$, the signal Vd at the terminal 21B may also be used as the FOG output. The integrator 52 and the ramp signal generator 53 constitute a feedback path of the closed loop.

In the embodiment of FIG. 10, as is the case with FIG. 2, the reference signal generator 24 is made up of the clock circuit or an oscillator 24A for generating the secondary reference signal of the frequency $2\omega_p$ twice higher than the phase modulation frequency $\omega_p$ and the frequency divider 24B which frequency divides the secondary reference signal Sr down to ½, providing the primary reference signal $S_{rl}$ of the frequency $\omega_p$. The frequency divided output, i.e. the primary reference signal $S_{r1}$, is provided to the terminal a side of the switch SW1 and the secondary reference signal $S_{r2}$ is provided to the terminal b side. The switch SW1 responds to the diagnosis instruction signal CTL1 from the diagnosis circuit 30 to selectively apply either one of the primary and secondary reference signals $S_{r1}$ and $S_{r2}$, as the reference signal Sr, to the synchronous detector 18. The rectangular wave of the frequency $\omega_p$ from the frequency divider 24B is also supplied to the phase modulator driver 22, wherein it is converted into a sine-wave signal and adjusted in level. The level-adjusted sine-wave signal is applied as the drive signal Sp to the phase modulator 16.

In the embodiment of FIG. 10, during the detection of the input angular rate the switch SW1 is held at the terminal a side, through which the signal $S_{r1}$ of the same frequency as the phase modulation frequency $\omega_p$ is applied as the reference signal Sr to the synchronous detector 18. As a result, the fundamental frequency component (the frequency $\omega_p$ component) contained in the interference light is synchronously detected and the detected output Vo is provided to the integrator 52. The output Vo of the synchronous detector 18 in this case is expressed by Eq. (2) and the frequency $f_R$ of the FOG output $R_{OUT}$ takes a value corresponding to the angular rate expressed by Eq. (13)'.

On the other hand, when the switch SW1 is connected to the terminal b side in response to the diagnosis instruction signal CLT1 from the diagnosis circuit 30, the secondary reference signal $S_{r2}$ of the frequency $2\omega_p$ is applied as the reference signal Sr to the synchronous detector 18. In consequence, the output Vo of the synchronous detector 18 becomes as expressed by Eq. (4) and it is given by the following equation omitting the coefficient.

$$V_o = K_2 \cdot \cos(\Delta\Phi) \qquad (14)$$

This output is integrated by the integrator 52 and the ramp signal $S_{rmp}$ of a frequency proportional to the integrated output Vd is generated by the ramp signal generator 53, from which it is supplied to the feedback phase modulator 51.

As the result of this, the operating point of the system is shifted by the negative feedback operation of the closed loop to a position where $\Delta\Phi = (2m-1)\pi/2$ or $-(2m-1)\pi/2$, where m is an integer such as 1, 2, 3, . . . , and in this example the system is operated at the position where $m=1$. That is, $\Delta\Phi = \pi/2$, and hence $\Delta\Phi_f = \pi/2 - \Delta\Phi_s$. In the case where no input angular rate is being applied, $\Delta\Phi_s = 0$. The frequency $f_R$ of the ramp signal $S_{rmp}$ in this instance will hereinafter be referred to as a bias frequency $f_b$, which is expressed by the following equation, using Eq. (12).

$$f_b = C/(4n_aL) \qquad (15)$$

In other words, the bias frequency $f_b$ given by Eq. (15) is generated when no input angular rate is being applied. The velocity of light C, the refractive index $n_a$ of the optical fiber and the length L of the optical fiber in Eq. (15) are all factors of small temperature coefficients, and hence remain substantially constant when the operation of the fiber optic gyro is normal; therefore, the ramp signal $S_{rmp}$ of the bias frequency $f_b$ can be used as a high precision diagnosis signal. Then, the ramp signal $S_{rmp}$ of the bias frequency $f_b$ is applied to the diagnosis circuit 30, which makes a check to see if the bias frequency $f_b$ is within a predetermined range and, if not, outputs the alarm signal ALM. The diagnosis circuit 30 may be formed to have a construction in which the ramp signal $S_{rmp}$ is converted by a frequency-to-voltage converter (F/V converter) into a voltage proportional to its frequency and the voltage is checked by, for example, the positive window comparator (CM1, CM2, G1) in FIG. 5 as to whether or not it is within a predetermined range. Alternatively, the circuit 30 may have a construction in which the number of pulses of the ramp signal $S_{rmp}$ is counted by a counter for each fixed period to obtain a value corresponding to the frequency of the ramp signal $S_{rmp}$ and it is checked by digital operation whether or not the value is within a predetermined range.

Figure 12:
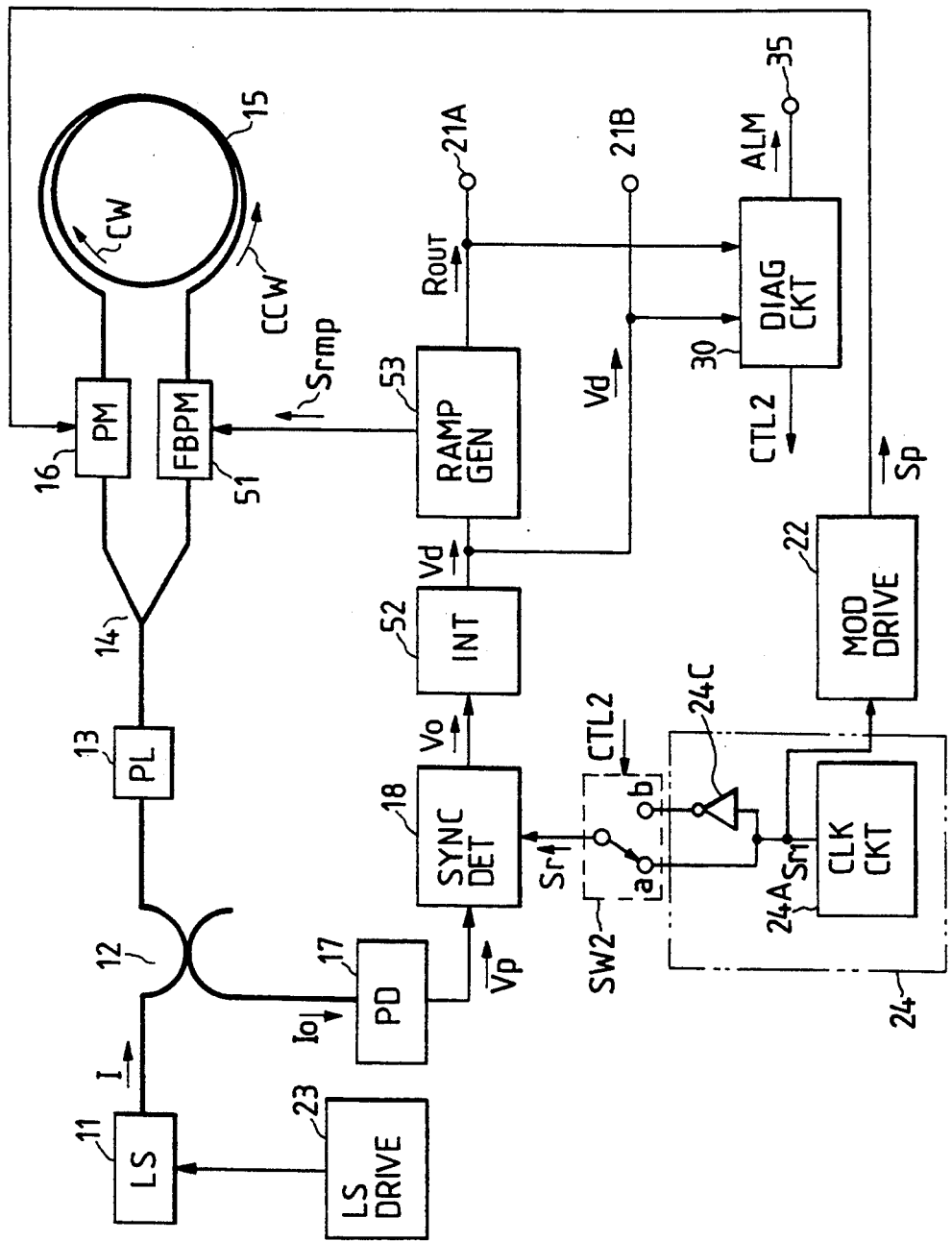
FIG. 12 is a block diagram illustrating another embodiment of the closed loop type fiber optic gyro according to the present invention.

FIG. 12 illustrates another embodiment of the present invention wherein, as is the case with the FIG. 3 embodiment, the inverter 24C for inverting the phase of the reference signal $S_{r1}$ is included in the reference signal generator 24 and the non-phase-inverted reference signal and the phase-inverted reference signal are provided to the terminals a and b of the switch SW2, respectively. In this instance, the reference signal $S_{r1}$ from the reference signal generator 24 is a reference signal of an odd harmonic frequency which is the same as the frequency $\omega_p$, for example. While the switch SW2 is connected to the terminal a side, a signal of the same frequency as the phase modulation frequency $\omega_p$ is applied as the reference signal Sr to the synchronous detector 18. In consequence, the fundamental frequency component of the same frequency as the frequency $\omega_p$, contained in the interference light, is synchronously detected and applied to the integrator 52, and by the negative feedback operation of the closed loop, its operating point is shifted to the position where $\Delta\Phi = 0 \pm 2m\pi$. The output of the synchronous detector 18 in this case is expressed by Eq. (2) and the frequency $f_R$ of the FOG output $R_{OUT}$ takes a value corresponding to the angular rate shown in Eq. (13).

When the switch SW2 is changed over to the terminal b side in response to the diagnosis instruction signal CTL2 from the diagnosis circuit 30, the reference signal $S_{r1}$ is phase shifted 180° by the inverter 24C and applied to the synchronous detector 18. As a result, the synchronous detector 18 produces an output opposite in polarity to the output V0 expressed by Eq. (2), and the operating point of the closed loop is shifted to the position where $\Delta\Phi = (2m-1)\pi$ or $-(2m-1)\pi$. m is an integer such as 1, 2, 3, . . . , and in this case the closed loop is operated at the position where $m=1$. That is, $\Delta\Phi = \pi$, and consequently, $\Delta\Phi_f = \pi - \Delta\Phi_s$ is obtained from Eq. (11). When no input angular rate is being applied, the Sagnac phase difference $\Delta\Phi_s$ is zero and the bias frequency $f_b$ which is the frequency $f_R$ of the ramp signal $S_{rmp}$ in this instance is expressed by the following equation, using Eq. (12) (k=1 in this case).

$$f_b = C/(2n_aL) \qquad (16)$$

As in the above-described embodiment, the velocity of light C, the refractive index $n_a$ of the optical fiber and the length L of the optical fiber are all factors of small temperature coefficients, and hence remain substantially unchanged when the operation of the fiber optic gyro is normal; therefore, the ramp signal $S_{rmp}$ of the bias frequency $f_b$ can be used as a high precision diagnosis signal. Then, the output $R_{OUT}$ of the ramp signal generator 53 is applied to the diagnosis circuit 30, which makes a check to see if the bias frequency is within a given range and, if not, delivers the alarm signal ALM to the outside.

Figure 13:
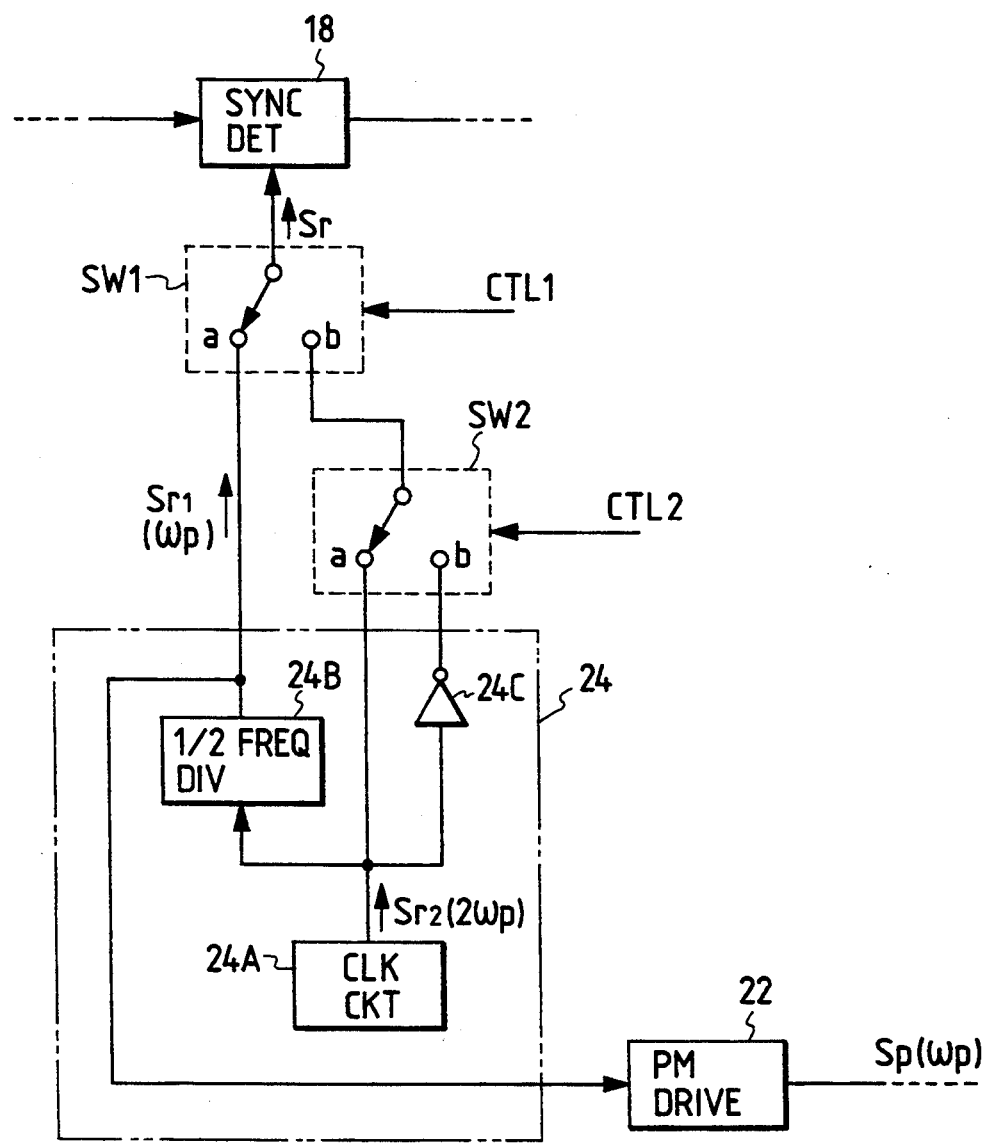
FIG. 13 is a block diagram illustrating the principal part of a modified form of the FIG. 10 embodiment like the FIG. 3 embodiment.

FIG. 13 illustrates the principal part of a modification of the FIG. 10 embodiment, wherein, as is the case with FIG. 3, the switch SW2 and the inverter 24C are provided to invert the phase of the secondary reference signal $S_{r2}$, thereby inverting the polarity of the synchronously detected output.

The input angular rate is detected in the state in which the switch SW1 is connected to the terminal a side under the control of the first diagnosis instruction signal CTL1, and the self-diagnosis is made in the state in which the switch SW1 is connected to the terminal b side. In the state in which the switch SW2 is connected to the terminal a side by the second diagnosis instruction signal CTL2, the self-diagnosis operation is the same as that when the switch SW1 is connected to the terminal a side in FIG. 10 (The phase difference $\Delta\Phi$ at the operation point is $\pi/2$.) and when no angular rate is being applied, the output $R_{OUT}$ of the frequency $f_b$ expressed by Eq. (15) is provided to the output terminal 21A (FIG. 10). When the switch SW2 is connected to the terminal b side by the second diagnosis instruction signal CTL2, the secondary reference signal $S_{r2}$ is inverted in phase by the inverter 24C and applied therefrom to the synchronous detector 18, and consequently, the polarity of the synchronously detected output V0 expressed by Eq. (14) is inverted. As a result, by the negative feedback operation of the closed loop of the system, the operating point is shifted to and settled at a position of the phase difference $\Delta\Phi = -\pi/2$ displaced $\pi$ (radian) apart from the immediately preceding phase difference $\Delta\Phi = \pi/2$. As the FOG output $R_{OUT}$ in this instance, the ramp signal $S_{rmp}$ is obtained which is equal in absolute value and opposite in polarity to the FOG output $R_{OUT}$ which is provided when the phase difference $\Delta\Phi$ at the operating point is $\pi/2$ (the switch SW2 being connected to the terminal a side) under the condition that the Sagnac phase difference $\Delta\Phi_s$ is zero. The ramp signal $S_{rmp}$ is provided as the self-diagnosis signal to the diagnosis circuit 30.

In the above, the output of the ramp signal generator 53 is used as the diagnosis signal in both of Eqs. (15) and (16), but the input voltage Vd of the ramp signal generator 53, which can be expressed by $Vd = f_b/K_{RG}$, where $K_{RG}$ is the gain of the circuit 53, can be used as the self-diagnosis signal. The diagnosis circuit 30, which judges from the diagnosis signals $R_{OUT}$ and Vd whether the frequency $f_b$ of the feedback signal $S_{rmp}$ is within the prescribed value, may be provided outside the fiber optic gyro, for example, in the host system.

The check of the bias frequency $f_b$ by the diagnosis circuit 30 is made, for example, simultaneously with the checking of other aircraft instruments of an aircraft loaded with this fiber optic gyro prior to its takeoff.

As described above, according to the present invention, the provision of the self-diagnosis feature in the fiber optic gyro enables it to detect an abnormality or failure or delivers an alarm signal for a self-diagnosis when the fiber optic gyro operates at degraded performance or its function is impaired by a fault, thereby ensuring that the host system using the fiber optic gyro avoids from a danger.

Although each of the foregoing embodiments has been explained as having an optical fiber coil 15 as a looped optical path, it is apparent that such an optical loop can be formed by a plurality of mirrors or on an optical IC.

It will be apparent that many modifications and variations may be effected without departing from the scope of the novel concepts of the present invention.

What is claimed is:

1. An optical interferometric angular rate meter comprising:
   an optical path forming at least one loop;
   branch means for splitting a light beam into two beams that propagate through said optical path as clockwise and counterclockwise light beams;
   means for causing the clockwise and counterclockwise light beams that have propagated through said optical path to interfere with each other;
   phase modulator means provided in cascade between said branch means and one end of said optical path, for phase modulating said clockwise and counterclockwise light beams at a predetermined frequency;
   photodetector means responsive to the intensity of interference light resulting from the interference of said beams for producing an electrical signal;
   reference signal generator means for generating a first reference signal of an odd harmonic frequency component of said predetermined frequency and a second reference signal of an even harmonic frequency component of said predetermined frequency;
   switching means for selectively outputting either one of said first and second reference signals;
   synchronous detector means supplied with said electrical signal from said photodetector means and one of said reference signals from said switching means for synchronously detecting said odd harmonic frequency component in said electrical signal when said first reference signal is supplied to said synchronous detector means from said switching means to output a signal corresponding to an input angular rate and for synchronously detecting said even harmonic component in said electrical signal when said second reference signal is supplied to said synchronous detector means to output a signal corresponding to said input angular rate; and
   diagnosis means for selectively supplying a diagnosis instruction signal to said switching means to cause said switching means to select said second reference signal and to compare the level of said even harmonic frequency component from said synchronous detector means with a predetermined reference level during the generation of said diagnosis instruction signal to output an alarm signal if said level of said even harmonic frequency component is not within a predetermined range.

2. The angular rate meter of claim 1, further comprising means responsive to said diagnosis instruction signal for selectively supplying said switching means with said second reference signal of said even harmonic frequency from said reference signal generator means intact or after inverting its phase through 180°.

3. An optical interferometric angular rate meter comprising:
   an optical path forming at least one loop;
   branch means for splitting a light beam into two beams that propagate through said optical path as clockwise and counterclockwise light beams;

means for causing the clockwise and counterclockwise light beams that have propagated through said optical path to interfere with each other;

phase modulator means provided in cascade between said branch means and one end of said optical path, for phase modulating said clockwise and counterclockwise light beams at a predetermined frequency;

photodetector means responsive to the intensity of interference light resulting from the interference of said beams for producing an electrical signal;

reference signal generator means for generating at least a first reference signal having an odd harmonic frequency component of said predetermined frequency;

synchronous detector means supplied with said electrical signal from said photodetector means and said first reference signal for synchronously detecting said electrical signal with said first reference signal to detect a sine component of a phase difference $\Delta\Phi$ between said clockwise and counterclockwise light beams and operative to output said sine component as a signal corresponding to an input angular rate; and self-diagnosis signal detector means supplied with said electrical signal from said photodetector means for detecting a cosine component of said phase difference $\Delta\Phi$ between said clockwise and counterclockwise light beams and operative to output said cosine component as a signal corresponding to a self-diagnosis signal.

4. The angular rate meter of claim 3, further comprising: first multiplier means for squaring the output from said synchronous detector means; second multiplier means for squaring the output from said self-diagnosis signal detector means; and adder means for adding the outputs of said first and second multiplier means and for providing the added output as said self-diagnosis signal.

5. The angular rate meter of claim 4, further comprising square root means for outputting the square root of the output of said adder means as said self-diagnosis signal.

6. The angular rate meter of claim 3, further comprising multiplier means for squaring the output from said synchronous detector means and adder means for adding the output of said multiplier means and the output of said self-diagnosis signal detector means at a predetermined ratio and for providing the added output as said self-diagnosis signal.

7. The angular rate meter of claim 3, further comprising absolute value generator means for generating an absolute value of the output of said synchronous detector means and adder means for adding the output of said absolute value generator means and the output of said self-diagnosis signal detector means at a predetermined ratio and for providing the added output as said self-diagnosis signal.

8. The angular rate meter of claim 4, further comprising diagnosis means which makes a check to see whether the level of said self-diagnosis signal is within a predetermined range and, if not, outputs an alarm signal.

9. An optical interferometric angular rate meter comprising:
an optical path forming at least one loop;
branch means for splitting a light beam into two beams that propagate through said optical path as clockwise and counterclockwise light beams;

interference means for causing said clockwise and counterclockwise light beams that have propagated through said optical path to interfere with each other;

phase modulator means provided in cascade between said branch means and one end of said optical path for phase modulating said clockwise and counterclockwise light beams at a predetermined frequency;

feedback phase difference generating means provided between said branch means and the other end of said optical path for developing a phase difference between said clockwise and counterclockwise light beams;

photodetector means responsive to the intensity of interference light resulting from the interference of said beams for producing an electrical signal;

reference signal generator means for generating a first reference signal of an odd harmonic frequency component of said predetermined frequency and a second reference signal of an even harmonic frequency component of said predetermined frequency;

reference signal switching means for selectively outputting either one of said first and second reference signals;

synchronous detector means supplied with said electrical signal from said photodetector means and a selected one of said first and second reference signals from said reference signal switching means, for synchronously detecting and outputting said odd harmonic frequency component signal when said first reference signal is supplied to said synchronous detector means and for synchronously detecting and outputting said even harmonic frequency component when said second reference signal is supplied to said synchronous detector means;

feedback signal generator means for deriving a feedback signal from the output of said synchronous detector means and applying said feedback signal to said feedback phase difference generating means to form a closed negative feedback loop, said feedback signal generator means setting a stable operation point of said negative feedback loop at a position where the phase difference between said clockwise and counterclockwise light beams is 90° or an odd multiple thereof when the synchronously detected output of said even harmonic frequency component is supplied from said synchronous detector means to said negative feedback loop; and means for selectively supplying a diagnosis instruction signal to said reference signal switching means to cause said reference signal switching means to output said second reference signal and for deciding whether the frequency of a signal generated by said feedback signal generator means is within a predetermined range during the generation of said diagnosis instruction signal to output an alarm signal if said frequency of said signal is not within said predetermined range.

10. The angular rate meter according to claim 9, wherein said feedback signal generator means includes integrator means for integrating the output of said synchronous detector, and ramp signal generator means for generating, as said feedback signal, a ramp signal of a frequency proportional to the integrated output of said integrator means.

11. An optical interferometric angular rate meter comprising:
   an optical path forming at least one loop;
   branch means which permits the passage therethrough of clockwise and counterclockwise light beams to said optical path;
   interference means whereby said clockwise and counterclockwise light beams having propagated through said optical path are caused to interfere with each other;
   phase modulator means provided between said branch means and one end of said optical path, for phase modulating said clockwise and counterclockwise light beams;
   feedback phase difference generating means provided between said branch means and the other end of said optical path, for developing a phase difference between said clockwise and counterclockwise light beams;
   photodetector means for detecting the intensity of (first occurrence) interference light from said interference means as an electrical signal;
   synchronous detector means whereby a component of the modulation frequency of said phase modulator means or an odd harmonic component of said phase modulation frequency is synchronously detected from the output of said photodetector means;
   feedback signal generator means which derives a feedback signal from the output of said synchronous detector and supplies said feedback signal to said feedback phase difference generating means to form a closed negative feedback loop;
   reference signal generator means for generating a first reference signal of an odd harmonic frequency of said phase modulation frequency and a second reference signal 180° out of phase with said first reference signal; and
   reference signal switching means responsive to a diagnosis instruction signal to change over said first and second reference signals from said reference signal generator means to shift 180° the phase of the reference signal to be applied to said synchronous detector means to shift a stable operation point of said feedback loop to a position where the phase difference between said clockwise and counterclockwise light beams is an odd multiple of 180°, whereby said feedback signal generated by said feedback signal generator means at that time is caused to be output as a self-diagnosis signal.

12. The angular rate meter of claim 11, wherein said reference signal generator means includes means for generating a third reference signal 180° out of phase with said second reference signal, said reference signal switching means being responsive to a second diagnosis instruction signal to selectively apply either one of said second and third reference signals to said synchronous detector means, and when supplied with said third reference signal switched from said second reference signal, said synchronous detector means sets said stable operation point of said negative feedback loop at a position displaced 180° apart from the phase difference between said clockwise and counterclockwise light beams and outputs, as a self-diagnosis signal, the feedback signal generated by said feedback signal generator means at that time.

13. The angular rate meter of claim 10, 11, or 12, wherein said feedback signal generator means includes integrator means for integrating the output of said synchronous detector, and ramp signal generator means for generating, as said feedback signal, a ramp signal of a frequency proportional to the integrated output of said integrator means.

14. The angular rate meter of claim 13, further comprising diagnosis means supplied with said feedback signal as said self-diagnosis signal, for making a check to see if the frequency of said self-diagnosis signal is within a predetermined range.

15. The angular rate meter of claim 13, further comprising diagnosis means supplied with said integrated output as said self-diagnosis signal, for making a check to see if the level of said self-diagnosis signal is within a predetermined range.

* * * * *